United States Patent [19]
Gustafson

[11] Patent Number: 5,245,638
[45] Date of Patent: Sep. 14, 1993

[54] METHOD AND SYSTEM FOR BENCHMARKING COMPUTERS

[75] Inventor: John L. Gustafson, Ames, Iowa

[73] Assignee: Iowa State University Research Foundation, Inc., Ames, Iowa

[21] Appl. No.: 605,237

[22] Filed: Oct. 29, 1990

[51] Int. Cl.$^5$ .............................................. G06F 11/34
[52] U.S. Cl. ................................... 395/575; 364/550; 364/514; 364/551.01
[58] Field of Search .......................... 395/575; 364/200-276.9 MS, 551.01, 550, 514, 200 MS

[56] References Cited

U.S. PATENT DOCUMENTS

| | | | |
|---|---|---|---|
| 4,849,879 | 7/1989 | Chinnaswamy et al. | 364/200 |
| 4,980,825 | 12/1990 | Tootell et al. | 364/580 |
| 5,031,124 | 7/1931 | Bosinoff et al. | 364/551.01 |
| 5,072,371 | 12/1931 | Benner et al. | 395/200 |
| 5,086,386 | 2/1992 | Islam | 395/600 |
| 5,088,058 | 2/1992 | Salsburg | 364/500 |
| 5,161,116 | 11/1992 | Schneider et al. | 364/551.01 |

OTHER PUBLICATIONS

H. J. Curnow and B. A. Wichmann, "A Synthetic Benchmark," *Computer Journal*, Feb. 1976.
D. H. Bailey and J. T. Barton, "The NAS Kernel Benchmark Program," *NASA Technical Memorandum 86711*, Aug. 1985.
"MIPS, Dhrystones and Other Tales," *Supermicro*, SM-54, Apr. 30, 1986, pp. 6-15.
J. J. Dongarra, "Performance of Various Computers Using Standard Linear Equations Software in a Fortran Environment," Argonne National Laboratory, *Technical Memorandum No. 23*, Feb. 2, 1988.
J. L. Gustafson, "Reevaluating Amdahl's Law," *Communications of the ACM*, vol. 31, No. 5, May 1988, pp. 532-533.
J. L. Gustafson et al., "Development of Parallel Methods for a 1024-Processor Hypercube," *SIAM Journal on Scientific and Statistical Computing*, vol. 9, No. 4, Jul. 1988, pp. 609-638.
M. Berry et al., "The Perfect Club Benchmarks: Effective Performance Evaluation of Supercomputers," *Center for Supercomputing Research and Development Report No. 827*, Nov. 1988.
P. Messina et al., "Benchmarking Advanced Architecture Computers," *Caltech Report C3P-712*, Jun. 1989.
"i860 ™ Microprocessor Performance Brief," *Intel Corporation Release 1.1*, Aug. 1989.
C. M. Goral et al., "Modeling the Interaction of Light Between Diffuse Surfaces," *Computer Graphics*, vol. 18, No. 3, Jul. 1984, pp. 213-222.

*Primary Examiner*—Robert W. Beausoliel, Jr.
*Assistant Examiner*—Phung My Chung
*Attorney, Agent, or Firm*—Leydig, Voit & Mayer

[57] ABSTRACT

A testing system and method for benchmarking computer systems. The system includes a store containing a scalable set of tasks to be performed to produce a solution in ever-increasing degrees of resolution as a larger number of the tasks are performed. A timing and control module allots to each computer a fixed benchmarking interval in which to perform the stored tasks. Means are provided for determining, after completion of the benchmarking interval, the degree of progress through the scalable set of tasks and for producing a benchmarking rating relating to the degree of progress for each computer.

19 Claims, 2 Drawing Sheets

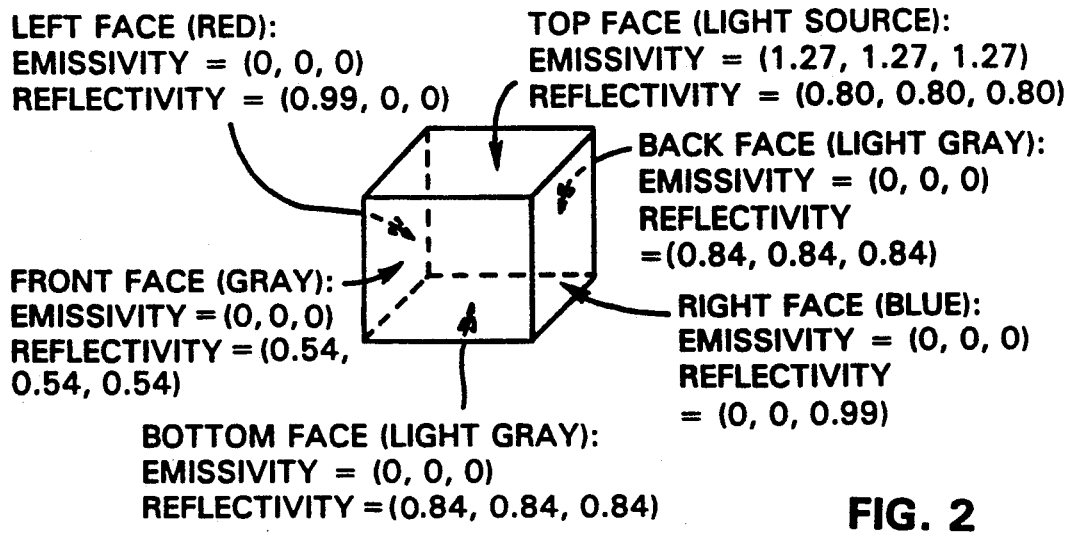
FIG. 2
FIG. 3
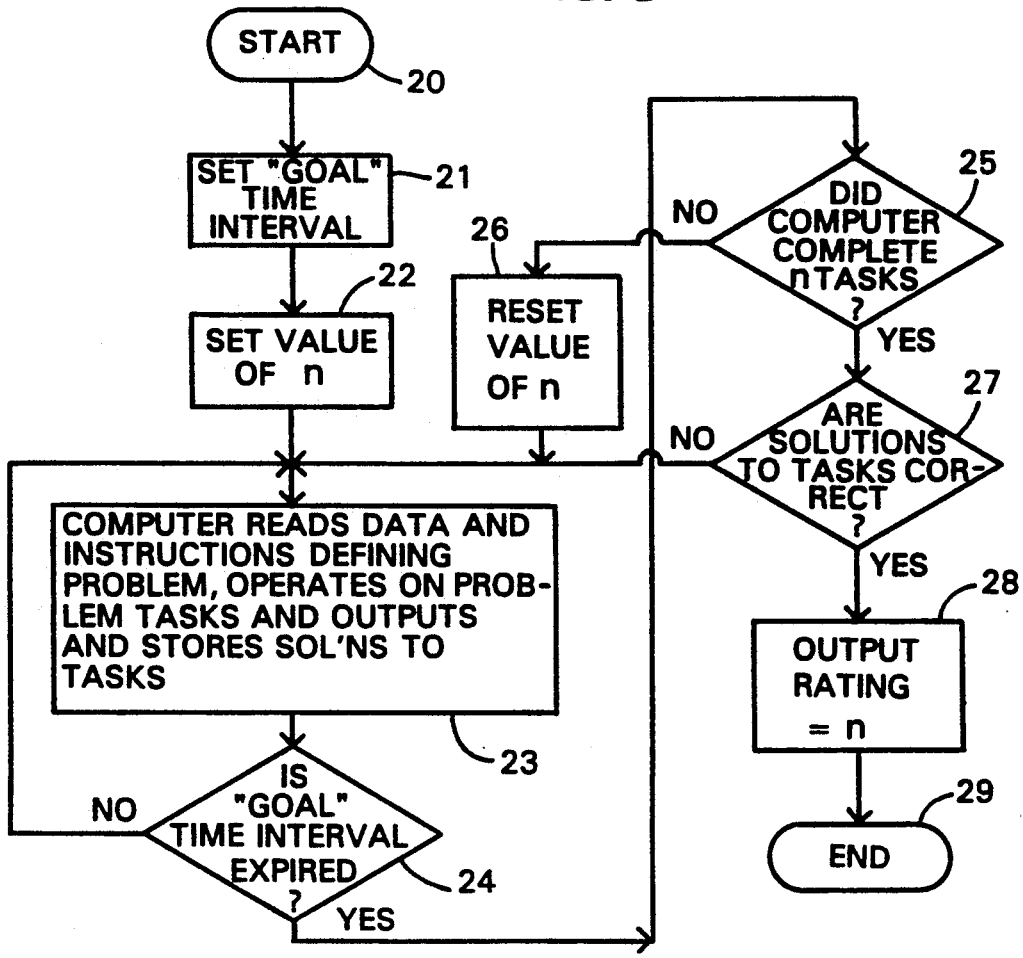

METHOD AND SYSTEM FOR BENCHMARKING COMPUTERS

FIELD OF THE INVENTION

This invention relates generally to computers and, more specifically, to a method and system for benchmarking computers having a wide range of performance capabilities.

BACKGROUND OF THE INVENTION

Computer power has increased over 70% per year for the last 50 years (or over 11 orders of magnitude), thus making it difficult to measure and compare performance of computers having vastly different performance capabilities with a benchmarking system that does not scale. Furthermore, since a given make of parallel processor may offer a performance range of over 8000 to 1, the scaling problem exists even if applied to computers of current vintage. Any benchmark of fixed size is soon obsoleted by hardware advances that render the time and space requirements of the benchmark unrepresentative of realistic use of the equipment. A common workaround consists of performing a fixed-size task repetitively, but this has proven to be less than satisfactory.

A related issue is the difficulty of scientifically comparing computers with vastly different architectures or programming environments. A benchmark designed for one architecture or programming model puts a different architecture at a disadvantage, even when nominal performance is otherwise similar. Assumptions such as arithmetic precision, memory topology, and "legal" language constructs are typically wedded to the job to be timed, in the interest of controlling as many variables as possible. This "ethnocentrism" in benchmark design has hampered comparison of novel parallel computers with traditional serial computers. Examples of popular benchmarks that have some or all of the foregoing drawbacks are LINPACK, the "PERFECT TM Club", the Livermore Loops, SPEC, Whetstones, and Dhrystones.

SUMMARY OF THE INVENTION

It is a primary object of the present invention to provide an improved benchmarking system for evaluating computers having vastly different performance capabilities.

A related object of this invention is to provide a benchmarking system which is scalable and, therefore, should not be soon obsoleted by computer performance advances.

Another object of this invention is to provide a benchmarking system which can be used to evaluate computers having different architectures or programming environments.

A still further object of this invention is to provide a benchmarking system which evaluates complete tasks performed by computers.

Other objects and advantages of the invention will be apparent from the following detailed description.

In accordance with the present invention, there is provided a benchmarking system for evaluating the performance of computers having a wide range of performance capabilities. The system includes a store containing a scalable set of tasks to be performed to produce a solution in ever-increasing degrees of resolution as a larger number of the tasks are performed. A time control allots to each computer a fixed benchmarking interval in which to perform the stored tasks. Means are provided for determining, after completion of the benchmarking interval, the degree of progress through the scalable set of tasks and for producing a benchmarking rating relating to the degree of progress for each computer. The inventive benchmarking system is provided in various computer architecture forms and languages and is designed to evaluate complete task performance, including input, set-up of equations, and computation and output of a solution.

BRIEF DESCRIPTION OF THE DRAWINGS

FIG. 2 illustrates a problem which is defined in a preferred embodiment of the inventive benchmarking system; and FIG. 3 is a flow chart generally illustrating the method used by the inventive benchmarking system to evaluate user computers.

DESCRIPTION OF THE PREFERRED EMBODIMENTS

Figure 1:
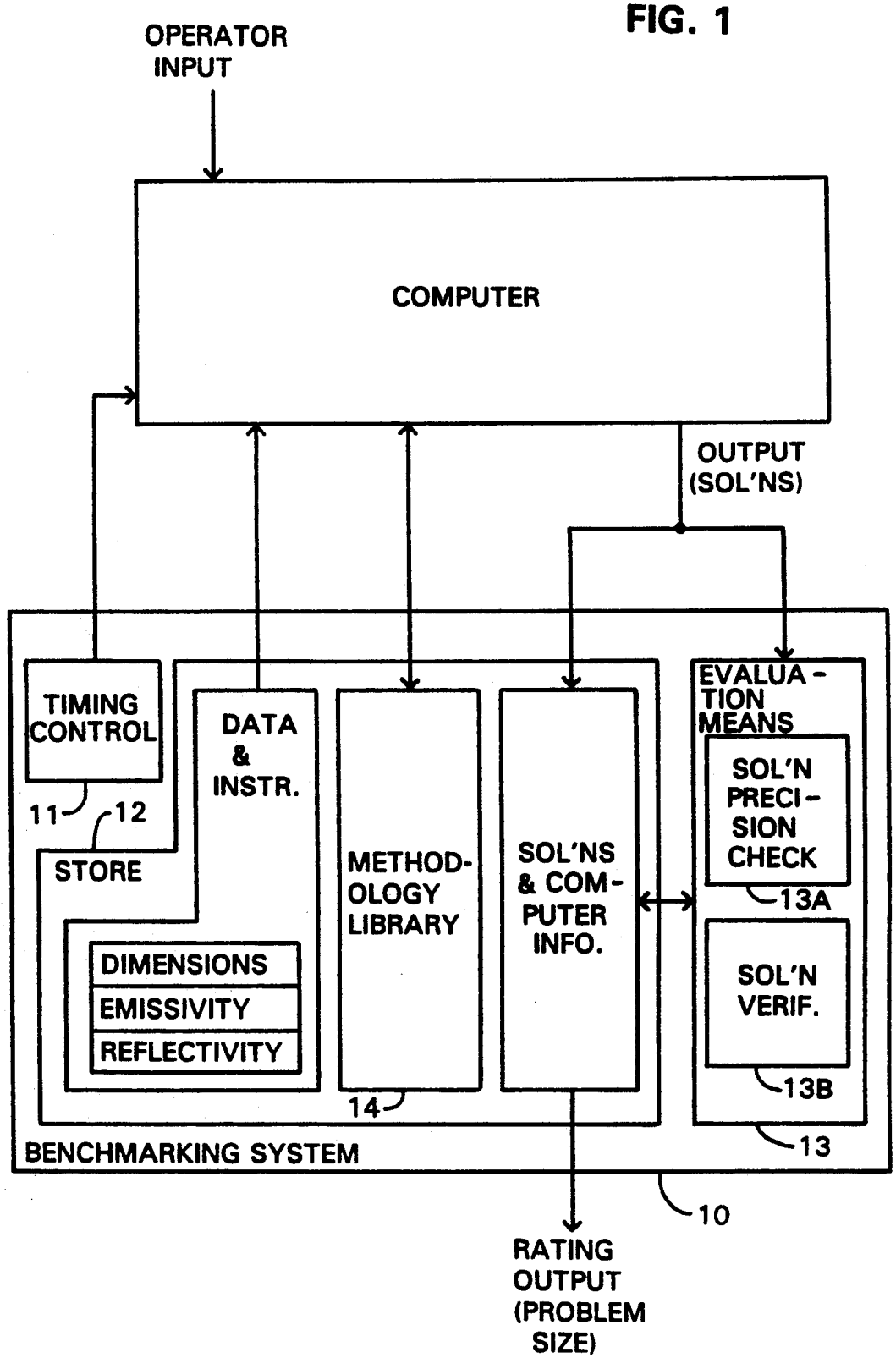
FIG. 1 a schematic block diagram of the inventive benchmarking system.

While the invention will be described in connection with particular preferred embodiments, it will be understood that it is not intended to limit the invention to those particular embodiments. On the contrary, it is intended to cover all alternatives, modifications and equivalents as may be included within the spirit and scope of the invention as defined by the appended claims.

Ideally, a benchmark should be scalable, broad in architectural scope, simple to apply and understand, representative of the way people actually use computers, and scientifically honest. A proper benchmark is both a task engineered to meet these goals and a set of rules governing the experimental procedures. It is more than just an application program or excerpt.

Many of these goals are at odds with one another. As with any engineering design, a certain amount of compromise is necessary. In particular, a single benchmark with a single figure-of-merit cannot fully characterize performance for the entire range of computing tasks.

It has historically been an assumption that in measuring computer performance the problem being solved be fixed as the computing power varies. Unfortunately, this is a dubious assumption since it does not reflect the way people actually use computers. Generally, problems scale to use the available resources (both memory and speed), such that the execution time remains approximately constant.

The problem of solving systems of linear equations is a scalable one, and one central to scientific computing. When the LINPACK software was first introduced, timings for solving a 100 by 100 system were gathered from a number of institutions and published. In 32-bit precision, the problem only required 40,000 bytes of storage and about 670,000 floating-point operations. A computer such as a VAX-11/780 took several seconds for the computation—a reasonable unit of time to wait for an answer. As computers have increased in size and speed, the 100 by 100 problem is increasingly inappropriate for measuring high-speed computers. The CRAY Y-MP8/832 performs that problem in less than 1/300 of a second, faster than almost any display can refresh to inform the user that the task is done. Even in 64-bit precision, the CRAY uses less than 1/30,000 of its main memory for such a problem. As a result, a new version of the benchmark was introduced for a 300 by 300 problem. When this also began to look small, a 1000 by 1000 version was added. Variations for precision and allowable optimizations have further multiplied the number of meanings of the phrase "LINPACK benchmark." The LINPACK benchmark has limited scalability even as a kernel, since its random number generator produces singular matrices for large matrix sizes. In fact, no major benchmark in use today has been designed for scalability, although most real scientific problems are inherently scalable.

In accordance with an important aspect of the present invention, "n" is used to indicate some measure of both problem size and difficulty. It need not be tied to instruction counts or floating point operations or bytes of storage; it should simply increase with the quality or complexity of the simulation. Scientific problems often involve n degrees of freedom, where n is variable over a wide range depending on the accuracy and realism desired. Such a problem is used as the basis of the benchmark and by varying n, the benchmark is able to track changes in available performance.

In the inventive benchmark, "n" is allowed to vary on a fine scale. That is, the problem should accommodate any integer n above some threshold and not, for example, restrict n to perfect squares or powers of 2. This will allow the exploration of the space of problem size versus number of processors in detail for parallel systems with adjustable numbers of processors.

Rather than fix the size of the job to be run, the inventive benchmark 10 fixes the time (using timing control instructions 11—see FIG. 1) and scales the work to be done to fit within that time. A time of one minute is used in a preferred embodiment, but any time range within the limits of human patience (about 0.1 second to 1 month) for a single computer task could be used as the constant. Shorter times do not fully exercise a system, and longer times are tedious and expensive to use as a benchmark. The benchmark should have logic to time itself and adjust automatically to find the problem size for the specified time, or allow the user to do the search manually.

An important consequence of the fixed-time model is that "Amdahl's law" loses its relevance and its predictive powers in understanding the limits to vectorization, parallel processing, and other architectural ideas.

It is important to note that a fixed-time benchmark is distinct from a "scaled speedup" model in which the problem size, as measured by the storage of variables, is scaled with the number of processors. On ensemble computers, simply replicating the problem on every processor will usually make total execution time increase by more than just the cost of parallelism. Fixing work per processor instead of storage per processor keeps run time nearly constant. A simple example is that of matrix factoring.

Consider the simple problem of solving n equations in n unknowns, with full coupling between equations (dense matrix representation). Arithmetic work varies as $n^3$, with storage varying as $n^2$. On a P-processor distributed memory system, simply replicating the storage structures on every processor will not generally lead to a fixed run time, since the arithmetic work to solve a matrix with $Pn^2$ elements is $P^{3/2}n^3$, whereas a fixed time model that assumes negligible parallel overhead on P processors would call for $Pn^3$ arithmetic work. This means that the scaled model execution time increases as $P^{\frac{1}{2}}$.

This situation appeared in the wave mechanics, fluid dynamics, and structural analysis problems run on the 1024-processor hypercube at Sandia, which similarly involved order $O(n^2)$ data storage and $O(n^3)$ arithmetic complexity. On the 1024-processor hypercube, to simulate a like amount of physical time (or convergence accuracy for the structural analysis problem) took about $1024^{\frac{1}{2}} = 32$ times as much ensemble computing time. It was then that we realized that the historical "Just make the problem larger!" argument for distributed memory might be simplistic to the point of being fallacious. The scaled model is still the best one to use if storage rather than time dictates the size of the problem that can be run, but the fixed-time model more realistically limits the extent to which problem scaling can be used to reduce communication cost for ensemble computers.

For these "$n^2$–$n^3$" problems, it is useful to think about increasing the ensemble size by powers of 64. With 64 times as much computing power, increasing n by a factor of 4 increases the work by a factor of $4^3 = 64$, which should keep execution time about constant if parallel overhead is low. However, the total data storage then only increases by a factor of $4^2 = 16$, not 64. Thus, each processor actually decreases in local storage requirements by a factor of 4. With a typical distributed memory approach of using subdomains on each processor, the subdomain dimensions shrink by 50% for every factor of 64 increase in the number of processors. Fixed-time performance models must reduce the size of subdomains as the number of processors P increases, if work grows faster than storage. For the $n^2$-$n^3$ problems, the linear size m of an m by m subdomain will vary as $P^{-1/6}$ if we assume linear performance increases On a log-log graph of problem size and ensemble size, the ideal fixed-time model appears as a line of slope $\frac{2}{3}$, the ratio of the exponents for storage complexity and work complexity.

Rather than define the task with a particular problem written in some language, the problem to be solved is specified at a more abstract level The benchmark states what is to be computed for a given range of possible inputs, but not how to compute it. The range of possible inputs is large enough that major deviations from running some form of the basic algorithm (such as looking up the answer in a large precomputed table) are not practical. This helps to control one experimental variable: the particular algorithms being compared Any version of the benchmark is permitted that arrives at correct answers, without artificial binding to language or architecture.

A benchmark should be able to exercise new architectural concepts as they arise, such as massive parallelism. Since most physical systems have ample parallelism, use of a physics-based problem provides a way for parallel computers to demonstrate their capabilities. An example of a trivially parallel problem is multiple runs with different starting assumptions. An example of an inherently sequential problem is the 3-body problem for a large number of timesteps. Both trivial parallelism and inherent sequentiality should be avoided as extreme cases of sequential/parallel ratios that are not representative of mainstream scientific computing.

Rather than specify an arithmetic precision to be used, such as "64-bit IEEE floating-point arithmetic," the inventive benchmark requires self-consistency in the result to a certain relative error. A user is then free to achieve a result within that tolerance using any calculation method or precision; the rules for precision are determined by the desired precision in the result, not by dictating the method of calculation. Physical conservation laws are very helpful in testing self-consistency in scalable problems Performance evaluation is inherently multidimensional. Yet, efforts to disseminate statistical information have not been very successful. The Livermore Loops present 24 speeds for 3 different vector lengths, with a variety of ways to sum and average the results, and yet one sees statements like, "Our computer runs the Livermore Loops at 10.8 MFLOPS." The SPEC benchmark also contains 10 components of widely varying nature (from matrix kernel operations to a complete circuit simulation), yet the "SPEC mark" is a scalar quantity derived from these components. Recognizing this, the inventive benchmark produces a single figure of merit number that is meaningful, to prevent misuse of multidimensional information.

Instead of using questionable performance measures, such as MIPS (Millions of Instructions Per Second) or MFLOPS (Millions of Floating-Point Operations Per Second), the basis of comparison is simply n, the problem size. Although other work measures can be provided by the benchmark as a guide to optimization, they are not the premier figure of merit. One computer, therefore, will be considered more powerful than another on this benchmark if and only if it runs a "larger" (bigger value of n) problem in the time allotted It is not necessary that work be a simple function of n (and it seldom is), but the work should be a strictly increasing function of n.

With a fixed-time paradigm, it becomes practical to include costs such as disk input/output and the setting up of equations to be solved. Since computers tend to improve so as to balance speeds with fixed-time rather than fixed-size jobs in mind, these previously excluded components of computer use are now fairly included in the measurement, rather than testing only the compute-intensive part of a task.

Since converting programs to different architectures imposes a burden that is reflected (at least temporarily) in reduced performance, the inventive benchmark is disseminated in as many representative forms as possible: traditional, vectorized, shared memory parallel, distributed memory parallel, etc. It is also maintained in many languages, such as C, Fortran 77, Pascal, and Fortran 90, to reduce language conversion effort. In the sense that computer benchmarks compare programmers as well as computers, a centralized and collective body of conversion tools makes the comparison fair and deemphasizes programming skill. For the same reason, great effort should be put into finding the "best serial algorithm," that is, the solution method with the smallest apparent complexity. Otherwise a problem thought to be some complexity like $O(n^3)$ might later prove to be $O(n^2 \lg n)$, which only some programmers would discover and exploit.

For some reason, virtually all published benchmark data deletes the source of the data. In contrast to scientific reporting, computer benchmark figures are seldom accompanied by the name of the person who ran the benchmark and the date the figures were submitted To preserve the integrity and accountability of the comparison, the inventive benchmark includes this data, along with the institutional affiliation of the person submitting the measurement.

A preferred embodiment of the benchmark utilizes a diagonally-dominant dense matrix problem found in the pioneering paper by Greenberg, Goral, et al. on "radiosity," which is the equilibrium radiation given off by a coupled set of diffuse surfaces that emit and absorb radiation. The problem is easily described and understood: A box is painted with a separate color for each face and one or more of the six faces also emits light. Emissivity and reflectivity (data is provided in the store 12 of the benchmark 10) are described as red-green-blue components for each face of the box. The problem is to find the color variation over each face. Goral's paper uses an example test case as shown in FIG. 2, with unit face sizes. That is, there is a white, light-emitting top face, shades of gray on the bottom, front, and back faces, and saturated red and saturated blue side faces. With diffuse surfaces, there is a "bleeding" of color to nearby surfaces.

Goral's paper offers limited scaling, breaking each face into 3 by 3, 5 by 5, and 7 by 7 "patches," with $6m^2$ equations to solve for an m by m patch decomposition. The coupling between patches is the "fraction of the sky" each patch "sees" occupied by another patch, for which the Goral paper uses an approximate quadrature.

The radiosity problem is coded in a scalable fashion, to allow any number of patches n, from six on up. An automatic decomposition algorithm that is both concise and amenable to parallel processing is used to divide each face of the box into a plurality of patches. A practical program should seek to reduce the maximum error by keeping patches as similar in area as possible. However, the solution for a perfect cube is too special to resemble a practical radiosity calculation. Hence, the inventive benchmark allows variable box dimensions (data is provided in the benchmark store 12), restricted to the range 1-100 length units, and decomposes the surface of the box into patches that are as nearly square and as nearly equal in area as possible. Exploitation of repeated geometric relationships becomes much more difficult, accuracy for a given number of patches is improved, and the problem more closely resembles a real problem for which a scientific computer might be used.

Letting $A_i$ be the total area of face i, and A the total area, then we want:

Number of patches on face i $\approx$ n x $A_i$/A.

Actually, we mark "start-end" patch numbers for each face. Face 1 starts with patch 1; face 6 ends with patch n. In between, face i starts with the patch that face i-1 ended with, plus one. Face i ends with patch $\lfloor \Sigma A_j/A + 0.5 \rfloor$, where the summation is j=1 to i. The "$\lfloor \ldots +0.5 \rfloor$" technique explicitly rounds to the nearest integer, breaking ties by rounding up. This explicitness was discovered to be necessary when w tested language independence between Fortran and Pascal, since implicit rounding functions in Pascal use round-to-nearest-even rules, whereas Fortran uses round-toward-zero rules.

Within a face, patches that are as nearly square as possible are desired to reduce discretization error. This is accomplished by dividing each face first into columns, with the number of columns given by $\lfloor \sqrt{(\text{patches/eccentricity})} + 0.5 \rfloor$. The eccentricity is the ratio of the dimensions. For example, to put 7 patches on a 2 by 3 face, use $\lfloor \sqrt{(7/3/2)} + 0.5 \rfloor = 3$ columns. We slightly increase robustness by using one column when this formula gives zero columns for a face. However, there must still be an error trap for the case of no patches on a face. For example, a 1 by 1 by 50 box with only six patches will decompose to having no patches on the 1 by 1 faces (each being only 1/200 of the surface area) and the benchmark must signal a need for more patches for such a problem.

Letting $n_{patch}$ be the number of patches on a face, and i the local number of a patch on that face, then $1 \leq i \leq n_{patch}$. Let $n_{col}$ be the number of columns on the face, as determined by the preceding discussion. Then patch i resides in the column given by $$i_{col} = \lfloor (i-1) \times n_{col}/n_{patch} \rfloor + 1 \qquad (1)$$

for arrays with index origin 1. Note that $1 \leq i_{col} \leq n_{col}$. This assignment of patches to columns distributes "remainder" patches evenly across the face rather than clumping them at one extreme.

We can invert formula (1) above to find the range of i for a given value of $i_{col}$:

$$i_{col} - 1 \leq (i-1) \times n_{col}/n_{patch} < i_{col} \Rightarrow (i_{col}-1) \times n_{patch}/n_{col} + 1 \leq i < n_{col} \times n_{patch}/n_{col} + 1.$$

Since the left and right bounds are noninteger in general, floor and ceiling functions are used to sharpen the range:

$$\lceil (i_{col}-1) \times n_{patch}/n_{col} \rceil + 1 \leq i \leq \lfloor i_{col} \times n_{patch}/n_{col} + 1 \rfloor \qquad (2)$$

where the ceiling function $\lceil n/m \rceil$ is calculable from $(n+m-1)/m$, a more language-independent construct. It then follows that the number of rows in a given column is $$n_{row} = \lfloor i_{col} \times n_{patch}/n_{col} \rfloor - \lceil (i_{col}-1) \times n_{patch}/n_{col} \rceil. \qquad (3)$$

This completes the solution to the scalability problem with respect to domain decomposition. For any problem of size six or greater, the preceding method decomposes the benchmark task in a reasonable, portable, concise, numerically sound manner. For a parallel ensemble, the geometry of any subset of the patches can be computed directly from the number of the patch, removing a potential serial bottleneck.

It is possible to make any scalable benchmark into a fixed-time benchmark simply by putting an upper time bound in the ground rules of the benchmark. If a user-written program can time its own execution, the program can scale itself to run in a specified time. Just as a recursive program operates on its own output, the fixed-time driver creates a benchmark that operates on its own performance.

The number to adjust is an integer, n, that describes the "size" of the problem in some sense. Here, n is the number of patches in a radiosity problem, but the technique is general.

The user is asked by the benchmark program to supply a desired time interval, which we call "goal." We have found, by experiment, that 60 seconds is a good compromise between realistically long run times and easy-to-benchmark short times, but the "goal" time is arbitrary. The user is then asked to supply a value of n such that the program will take less than "goal" time to execute.

The program tests that n is within limits imposed by the problem and the computer. For example, the radiosity problem requires $n \geq 6$ (if the box is highly eccentric, the minimum n could be larger). If n passes as a valid lower bound, the timer is started and the benchmark is run. If the benchmark fails to run in less time than "goal," the driver repeats its request until a satisfactory lower-bound n is supplied. If it succeeds, the n is saved and the driver proceeds to the next step.

The next stage is to find an n such that the run time is greater than or equal to "goal." The reason is to disallow equality with "goal," which rewards low-resolution timers. For example, a computer capable of self-timing only to 1 second resolution might run 60.999 seconds, report it as 60 seconds, and thus be able to run a larger n than a computer with a more precise clock.

If "goal" is large, n might exceed the value allowed by the computer memory allocated by the program being benchmarked. The user is responsible for altering the benchmark to allow sufficiently large n, even if it means explicit management of mass storage (running out of memory to achieve a one-minute benchmarking run might be interpreted as a symptom of unbalanced or special-purpose computer design). If the n supplied as an upper bound fails to equal or exceed the "goal" time, the driver repeats its request until a satisfactory n is supplied.

Note that a given computer might not be powerful enough to run even the minimum n permitted by the benchmark in "goal" time. The problem and "goal" have been chosen such that virtually every programmable machine currently marketed is sufficiently powerful to qualify, although computers from a few years ago might not.

With an upper bound and a lower bound, the problem of finding the n that is as large as possible without requiring time greater than or equal to "goal" is a classic root-finding problem. The time is not necessarily an increasing function of n, nor is it particularly "smooth" for most computers. Pipeline lengths, cache sizes, and memory organization can complicate performance enough to destroy monotonicity. Methods such as Newton-Raphson iteration were tried and found nonconvergent in general, for the preceding reason.

There might also be random timing variation for any single value of n. If the variation is greater than the difference in timing for values of n differing by unity, then the n determined by the driver will be a random variable. Intuitively, the distribution of n is zero above some integer, since the hardware has inherent limits. Hence, we look at the record largest n achievable over any desired number of tests to again reduce the measurement to a single integer value.

A convergent method that is used in the current version of the benchmark driver is recursive bisection: While $n_{upper} - n_{lower} > 1$, find $n_{mean} = (n_{upper} + n_{lower})/2$. Time the benchmark for $n_{mean}$; if less than "goal," replace $n_{lower}$ by $n_{mean}$ and repeat. Otherwise, replace $n_{upper}$ by $n_{mean}$ and repeat.

Once $n_{upper} - n_{lower} = 1$, the desired n is $n_{lower}$. A problem with this method is that random fluctuations in the timing might assign a particular n as below "goal" on one round, but above it on the next. In the preferred embodiment, the workaround to this problem is to refer to the instance where the execution time was below "goal" and use that run as the result. We ignore the "final" report of an n value if it equals or exceeds "goal
"

The fixed-time driver has been developed for several computers and written in several languages. It works satisfactorily in most cases. On the MasPar and Cray versions, the machines have a preference for multiples of 64 in the problem size, and manual selection is used to find the largest problem that runs in less than one minute.

Two approaches are used in the inventive benchmark to remove ties to a particular language or architecture: a high-level problem description and a multiplicity of working examples covering a wide spectrum of environments.

A high-level problem description is practical if guidance is supplied as to what appears to be a "good" solution method, and if the input-output is specified so as to rule out unrealistic use of precomputed answers. Supplying guidance is like an athletic competition: although certain techniques are known to be effective, competitors may choose what works best for them individually. Advances in technique that appear general are made publicly known as quickly as possible to eliminate an advantage based on disparate knowledge.

If only a single input and output are specified, a benchmark with such liberal rules quickly degenerates into the trivial recall of precomputed answers. But if input is not specified, run times will vary with input (in general), introducing an uncontrolled variable. The solution is this: the program must work for a specified range of inputs, and must time an input (supplied as standard) using the same method used for arbitrary input. Stated another way, the program cannot contain any information specific to the standard case.

For the radiosity problem, the standard case is much like the example in Goral's paper shown in FIG. 2. The main changes are to make the faces rectangular (13.5 by 9 by 8) rather than square, and to derive the coupling with exact analytic expressions instead of approximate quadrature. The matrix formulation and solution are similar, except that we divide the matrix row entries by the area of the patch to which they pertain, which renders the matrix symmetric.

To date, the high-level description of the radiosity problem, as supplied by Goral's paper, has been converted into the following forms:
- Fortran 77 for Sun4, VAX, IBM PC, etc.
- Vectorized Fortran for single processor Iris and NCUBE computers (the NCUBE is scalar, but benefits from vector library calls).
- Pascal for IBM PC compatibles.
- BASIC for Macintosh (both interpreted and compiled).
- C for SUN4 and other UNIX-based workstations.
- C (extended with plural variables) for MasPar, 1024 to 16384 processors.
- Fortran with parallel loop compiler directives for CRAY-2 and Iris (shared memory, 1-8 processors).
- Fortran with message-passing constructs for NCUBE (up to 4096 processors).
- Fortran with "PARDO" constructs for Myrias In the inventive benchmarking system, the goal is to compute an answer within a specified tolerance of the correct answer, and not specify the word size or anything else about how to get to that level of precision. The benchmark has two self-consistency checks (i.e., evaluation means 13—see FIG. 1). One is inside the timed part of the benchmark, since the check is also used to improve the accuracy of the answer if within tolerance limits. The other is a pass/fail verification after the computation is done, not timed. It is very unlikely that an incorrect program will pass both tests, and experience has confirmed this. Comparison of output files and examination of graphic displays of the output can also be used as a convenient way to check program correctness for small problems.

The first self-consistency check 13a involves matrix setup. Let $f_{ij}$= the fraction of the hemisphere taken up by patch j, as seen from patch i. For example, $f_{ij}$ is approximately 1 for close, parallel planes, about 0.2 for unit squares a unit apart or perpendicular and touching, and nearly 0 for patches that are small relative to their separation.

These $f_{ij}$ are variously called "form factors" or "coupling factors" or "shape factors" in the radiation transfer literature. Analytic means exist to compute them for special geometric shapes, based on evaluation of 4-dimensional integrals.

It is important for a benchmark program to be concise and manageable, to minimize conversion effort and maintenance costs, yet represent the demands of a real computer application. These terse setup portions of the benchmark only take about 200 lines of a high-level computer language.

By using closed form expressions, the $f_{ij}$ factors inherit the property that $\Sigma f_{ij} \approx 1$, for all i, when correctly evaluated. Since each $f_{ij}$ requires hundreds of operations to evaluate (including square roots, logarithms, and arctangents), the summation provides a sensitive independent test of the matrix setup. A tolerance of $0.5 \times 10^{-8}$ was chosen for the $\Sigma f_{ij}$ to deviate from unity, that is, an accuracy of 7 decimals. This requires somewhat more than "single-precision" arithmetic on most computers (7.4 decimals ideally, but fewer because of cumulative errors) but is comfortably within the "double-precision" range. This provides a level playing field for the various arithmetic formats. It is usually advantageous to use the smallest number of bits or digits that satisfies the tolerance. This number will vary with problem size, but the user is free to meet the tolerance by adjusting precision as needed, throughout the task.

For $\Sigma f_{ij}$ values within the tolerance limits but not numerically equal to unity, the $f_{ij}$ values are normalized by the sum to force the sum to unity. This helps control minor cumulative rounding errors. Instead of normalizing the entire row of the matrix, simply scale the right-hand side scalar and diagonal elements, trading n multiplications for two.

The area of patch i can be denoted $a_i$. Because the $a_i$ are not all the same, $f_{ij} \neq f_{ji}$ in general. This means the radiosity matrix is nonsymmetric. However, if the matrix rows are divided by $a_i$, the matrix becomes symmetric. Symmetry reduces solution cost by roughly a factor of two. Again, the scaling by $a_i$ is applied to the diagonal and right-hand side, saving $n^2$ multiplications by $1/a_i$ of the other matrix elements. Cholesky factorization can be used for the matrix solution, for which there are well-tuned routines in many software libraries.

The second self-consistency test 13b involves "residual" checks. For the linear system $Ax=b$, where A is an n by n matrix and x and b are vectors of n elements, the residual is defined as $||Ax-b||$, where a computationally easy norm is chosen, the maximum of the absolute values of the elements. To specify a tolerance, the residual is normalized by the norms of A and x, a quantity sometimes called the relative residual. It is required that $||Ax-b||/||A|| \ ||x|| < 0.5 \times 10^{-8}$ for each of the x values computed by the benchmark (one x for each component of the radiation: red, green, and blue). Thus, the residual check is really three tests, all of which must pass. This residual check is performed after timing, since application software would generally eliminate such tests once program errors appeared to have been removed.

Users are encouraged to use whatever means work best to reduce the residual to the required tolerance. The problem is well-posed. Partial pivoting would add $O(n^2)$ floating-point comparison operations and introduce a serial bottleneck into the factoring algorithm. When partial pivoting was tried, the pivot was always on the diagonal, and so pivoting was eliminated from the benchmark. Diagonal dominance can be easily provided from the fact that reflectivity is less than unity and the sum of off-diagonal elements in a row is unity.

The second self-consistency check greatly improves the "rules" under which the benchmark is run. Some parallel computers might favor iterative methods, or solution methods of very different internal composition from the one supplied. The alternative method merely has to satisfy the $0.5 \times 10^{-8}$ tolerance for the full range of possible inputs, and it is then deemed a fair method to use.

For this reason, the range of possible inputs has been carefully bounded. The faces can range in dimension from 1 to 100 on an edge, and from 0.001 to 0.999 in reflectivity. Some cases in these ranges will be difficult to solve by iterative methods.

Iterative methods must numerically accumulate enough terms of a slowly-converging infinite series to account for the multiple low-loss reflections of radiation from the left face traveling down the box to the right. Just as $$1/(1+x) \approx 1-x$$

favors the right-hand side for ease of computation when x is near 0, $$1/(1+x) \approx 1-x+x^2-x^3+\ldots+x^{11}$$

will favor the "direct method" on the left if x is slightly larger than $-1$. In this manner, competing machines are constrained to use methods that are similar (that is, direct solvers), but not by artificial rules. The rules are instead driven by requirements for the output delivered to the user.

The notion of using operation counts or other "work" measures for computer performance evaluation has several drawbacks. It tends to reward inefficient methods that exercise the hardware, even if they get the result more slowly. The notion of what to consider an "operation" has not stood the test of time. In the 1950's and 1960's, multiplications dominated overall run time for compute-intensive problems, so complexity analysis considered only multiply and divide counts. By the 1970's additions and multiplications had comparable cost and were often weighted equally. Now, memory references often take longer than the arithmetic, but are much harder to assess analytically for an abstract computer.

To date, the generally-accepted practice has been to use execution time as the figure or merit, fixing the problem to be timed. This has disadvantages already described, but at least execution time is a physically measurable quantity.

Here, we make problem size the figure of merit (the larger the better), another measurable quantity not subject to dispute. The use of problem size can lead to slightly unconventional ranking of machines, as shown in Table I:

TABLE I

| Differences in Figure of Merit | |
|---|---|
| Computer A | Computer B |
| 1392 patches | 1400 patches |
| 2.70 billion operations | 2.74 billion operations |
| 58 seconds | 59 seconds |
| 46.6 MFLOPS | 46.4 MFLOPS |

By conventional measures, Computer A is ranked higher in performance since it performed more MFLOPS. By the measure proposed here, Computer B is ranked higher because it ran a larger problem (more patches). Overall, the effect should generally be only a slight difference from the MFLOPS-based ranking, except when the MFLOPS for a computer is a jagged function of the problem size.

Since supercomputer purchases are generally motivated by a desire to run larger problems (not achieve higher MFLOPS rates), the problem size makes a better figure of merit. This is the "grand challenge" esthetic. It contrasts, say, with the esthetic of maximizing conventional data processing throughput. The achievement of a 40,000-patch benchmarking run might be more significant than the achievement of a "teraflop" of nominal speed, since there would be at least a little assurance that the speed might be applicable to real problems.

The idea of a fixed-time benchmark solves the decades-old difficulty of including such parts of the benchmark execution as program loading, input, output, and other tasks with rather invariant time cost. With a fixed-sized problem, these components eventually dominate total execution time as vector or parallel methods are applied to the compute-intensive portions of the job (Amdahl's 1967 argument against parallel architectures). Hence, previous benchmarks have solved the problem by including only the kernel in the timing, with an enormous loss of realism.

With a fixed time of about one minute, the non-kernel part of the work should take just a few seconds, and can be included in the timing without distortion effects. For the radiosity problem described here, time should grow as

| $O(1)$ | for program loading, |
|---|---|
| $O(1)$ | for reading problem geometry, |
| $O(n^2)$ | for setting up the matrix, |
| $O(n^3)$ | for solving the matrix, and |
| $O(n)$ | for storing the solution. |

Traditional benchmarks only time the $O(n^3)$ part, or possibly both $O(n^2)$ and $O(n^3)$ parts. In contrast, the inventive benchmark times everything essential to the run other than the original writing and compiling of the program (which is presumably amortized over many runs and hence legitimate to neglect). Interestingly, the lower-exponent parts of the problem are the hardest to make run in parallel, so massively-parallel architectures will reveal the same input/output challenges for this benchmark that they face in general applications.

To reduce the effect of variable human analytical skill in adapting a given program to a particular computer, the same technique already mentioned above is applied, namely, a variety of best-effort versions (i.e., methodologies) are maintained in a library 14 of possible starting points, for as many different architectures and languages as possible. New versions, motivated by the desire of a vendor to show high performance, are added to the library rather than kept proprietary. In this way, contributors must provide not just performance data but also their method for achieving that performance in software, so that others may build on their accomplishment.

As described above and shown generally in FIG. 3, the inventive benchmarking system utilizes a fixed-time, scalable-problem method for evaluating the performance capabilities of different computers. Operation begins (step 20) when the inventive benchmark is loaded into a user computer. A fixed "goal" time interval is set (step 21) and a value of n is selected (step 22), designating the size of the problem to be attempted within the fixed "goal" time interval. The computer reads the data and instructions provided by the benchmark which define the problem, operates on the problem, and outputs and stores solutions to the individual tasks (step 23) until the "goal" time interval expires (step 24). After expiration of the time interval, a check is made (step 25) as to whether the designated n tasks were completed. If not, the value of n is reset (i.e., lowered —step 26—) and the computer attempts the reduced-size problem. On the other hand, if the computer did complete n tasks, a check is made (step 27) to see if the solutions to the tasks are correct. If they are not, the computer reattempts the problem. If the solutions are correct, however, the output rating for the computer is set at n (step 28) and the benchmarking ends (step 29).

As can be seen from the foregoing detailed description, this invention provides an improved method and system for benchmarking computers of vastly different performance capabilities. The inventive benchmark is scalable and should not, therefore, be soon obsoleted by computer performance advances. The benchmark evaluates complete tasks (including data input/output, problem set-up, and computation) and can be used to evaluate computers having different architectures or programming environments.

What is claimed is:

1. A benchmarking system for evaluating the performance of computers having a wide range of performance capabilities, the benchmarking system comprising:

memory means for storing data and instructions that define a problem to be solved by each of the computers to be benchmarked, the problem defined by the data and instructions being scalable such that computers of greater performance capability will execute the instructions to provide a higher resolution solution to the problem than a computer of lesser performance capability; and timing control means for providing timing instructions that allot each of the computers a fixed interval of time in which to set up and work on the problem and store solutions to completed tasks, the fixed interval being the same for all computers to be evaluated;

benchmarking output means for assigning a measure of performance for each of the computers related to the number of tasks that it correctly completed within the allotted time interval.

2. The benchmarking system of claim 1, wherein the data and instructions include at least information as to a set of parameters associated with a box including dimensions, emissivity and reflectivity of faces of the box which are each a separate color, each face being divisible into a plurality of patches, the problem being to find color variation over each face of the box by completing tasks which involve computing color information for each of a scalable number of patches.

3. The benchmarking system of claim 2, wherein the color information for each patch is coupled to the color information of other patches based on spatial relationships between the patches.

4. The benchmarking system of claim 1, wherein the allotted fixed time interval is one minute.

5. The benchmarking system of claim 1, wherein completion of each task includes at least input of data and instructions, set-up of equations, and computation and output of a solution.

6. The benchmarking system of claim 1, said system including means for conducting a first accuracy check within the allotted fixed time interval, the first accuracy check requiring comparison of precision in a solution of the completed task to a specified tolerance of a correct solution.

7. The benchmarking system of claim 6, said system further including means for conducting a second accuracy check, the second accuracy check comprising a solution verification which is done after expiration of the allotted fixed time interval.

8. The benchmarking system of claim 1, wherein the memory means and the data and instructions stored therein are usable for evaluating computers having different architecture forms.

9. The benchmarking system of claim 1, wherein the memory means and the data and instructions stored therein are usable for evaluating computers having at least the following architecture forms: traditional serial computers, vectorized, shared memory parallel and distributed memory parallel.

10. The benchmarking system of claim 1, wherein the memory means and the data and instructions stored therein are usable for evaluating computers which operate using different computer languages.

11. The benchmarking system of claim 1, wherein the memory means and the data and instructions stored therein are usable for evaluating computers which operate using at least one of the following computer languages: C, Fortran 77, Pascal and Fortran 90.

12. A testing system for benchmarking computer systems having a wide range of performance capabilities, the testing system comprising the combination of:

a store containing a scalable set of tasks to be performed to produce a solution in ever-increasing degrees of resolution as a larger number of the tasks are performed;

timing control means for allotting to each user computer a fixed benchmarking interval in which to perform the stored tasks, the timing control means allotting a benchmarking interval which is the same for all computer systems to be tested;

evaluation means for determining, after completion of the benchmarking interval, the degree of progress through the scalable set of tasks performed by each user computer during the benchmarking interval; and output means for producing a benchmark rating related to the degree of progress through the scalable set of tasks performed by each user computer.

13. The testing system of claim 12, wherein the scalable set of tasks relate to finding color variation over each face of a box which has separately colored faces, the store containing information defining at least a set of parameters for the box including dimensions, emissivity and reflectivity of faces of the box.

14. The benchmarking system of claim 13, wherein a solution in ever-increasing degrees of resolution is produced by dividing each face of the box into a plurality of patches and computing color information for each of the patches.

15. A method of evaluating the performance of computers having a wide range of performance capabilities, comprising the steps of:
   providing a scalable set of tasks to be performed to produce a solution in ever-increasing degrees of resolution as a larger number of the tasks are performed;
   allotting to each user computer a fixed interval of time in which to perform tasks within the scalable set of tasks, the fixed interval being the same for all computers to be evaluated;
   determining, after completion of the time interval, the degree of progress through the scalable set of tasks performed by each user computer during the time interval and the solution derived for said degree of progress; and
   producing a benchmarking rating related to the degree of progress through the scalable set of tasks performed by each user computer.

16. The method of claim 15, wherein the scalable set of tasks is provided by defining a problem related to finding color variation over each face of a box which has separately colored faces, said defining step including defining information regarding a set of parameters for the box including at least dimensions, emissivity and reflectivity of faces of the box.

17. The method of claim 16, wherein the scalable set of tasks is further defined by providing information which enables a user of computer to divide each face of the box into a scalable plurality of patches and compute color information for each of the patches.

18. The method of claim 15, further comprising the step of conducting a first accuracy check within the allotted fixed time interval by requiring a comparison of precision in a solution of the completed task of a specified tolerance of a correct solution.

19. The method of claim 18, further comprising the step of conducting a second accuracy check after completion of the allotted fixed time interval, this second accuracy check comprising a solution verification.

* * * * *

UNITED STATES PATENT AND TRADEMARK OFFICE
CERTIFICATE OF CORRECTION

PATENT NO. : 5,245,638
DATED : September 14, 1993
INVENTOR(S) : John L. Gustafson It is certified that error appears in the above-identified patent and that said Letters Patent is hereby corrected as shown below:

Col. 4, line 49, after "compared", insert a period --.--

Col. 5, line 30, after "allotted", insert a period --.--

Col. 6, line 56, cancel "w" and insert --we--

Col. 6, line 67, in the formula, delete "$\overline{(7/3/2)}$" and insert -- $\sqrt{(7/3/2)}$ --

Col. 7, line 34, before the formula "(n+m-1)/m" insert -- $\lfloor$ -- ; after the formula, insert -- $\rfloor$ --

Col. 16, line 19, delete "task of" and insert --task to--

Signed and Sealed this

Twenty-sixth Day of April, 1994

Attest:

BRUCE LEHMAN

*Attesting Officer*  *Commissioner of Patents and Trademarks*